US012720198B2

(12) United States Patent
Kawanishi

(10) Patent No.: US 12,720,198 B2
(45) Date of Patent: Aug. 25, 2026

(54) FOCUS ADJUSTMENT APPARATUS AND METHOD, IMAGE CAPTURING APPARATUS, IMAGE CAPTURING SYSTEM, AND STORAGE MEDIUM

(71) Applicant: CANON KABUSHIKI KAISHA, Tokyo (JP)

(72) Inventor: Atsuya Kawanishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/977,229

(22) Filed: Dec. 11, 2024

(65) Prior Publication Data

US 2025/0211855 A1 Jun. 26, 2025

(30) Foreign Application Priority Data

Dec. 20, 2023 (JP) ................................ 2023-215047

(51) Int. Cl.

*G03B 13/36* (2021.01)
*H04N 23/67* (2023.01)
*H04N 23/695* (2023.01)
*H04N 23/00* (2023.01)

(52) U.S. Cl.

CPC ........... *H04N 23/673* (2023.01); *G03B 13/36* (2013.01); *H04N 23/695* (2023.01)

(58) Field of Classification Search

CPC ......... G03B 13/36; H04N 23/00; H04N 23/60

USPC ........... 348/207.99, 208.12, 208.14, 208.11, 348/208.2, 208.99

See application file for complete search history.

(56) References Cited

U.S. PATENT DOCUMENTS

2015/0323760 A1* 11/2015 Tomosada ................ G02B 7/28 250/201.2
2016/0191784 A1* 6/2016 Murayama ......... G02B 27/0075 348/347
2016/0277668 A1* 9/2016 Yokozeki ............ H04N 23/672

FOREIGN PATENT DOCUMENTS

JP 2009003208 A 1/2009

* cited by examiner

*Primary Examiner* — Daquan Zhao
(74) *Attorney, Agent, or Firm* — Cowan, Liebowitz & Latman, P.C.

(57) ABSTRACT

A focus adjustment apparatus detects a rotation angle of a holding unit that holds an imaging unit including an image sensor and an optical system including a focus lens and that has a rotation unit that rotates the imaging unit, controls a position of the focus lens to perform focus adjustment, and, in a case where a rotation angle of the holding is detected by the first detection unit, calculates a correction amount for correcting a shift of an in-focus position according to a change amount of a distance between the imaging unit and a subject corresponding to the rotation angle. In a case where the focus adjustment is not performed in the AF mode and the subject is tracked using the rotation unit, the focus adjustment apparatus controls the position of the focus lens based on the correction amount.

18 Claims, 11 Drawing Sheets

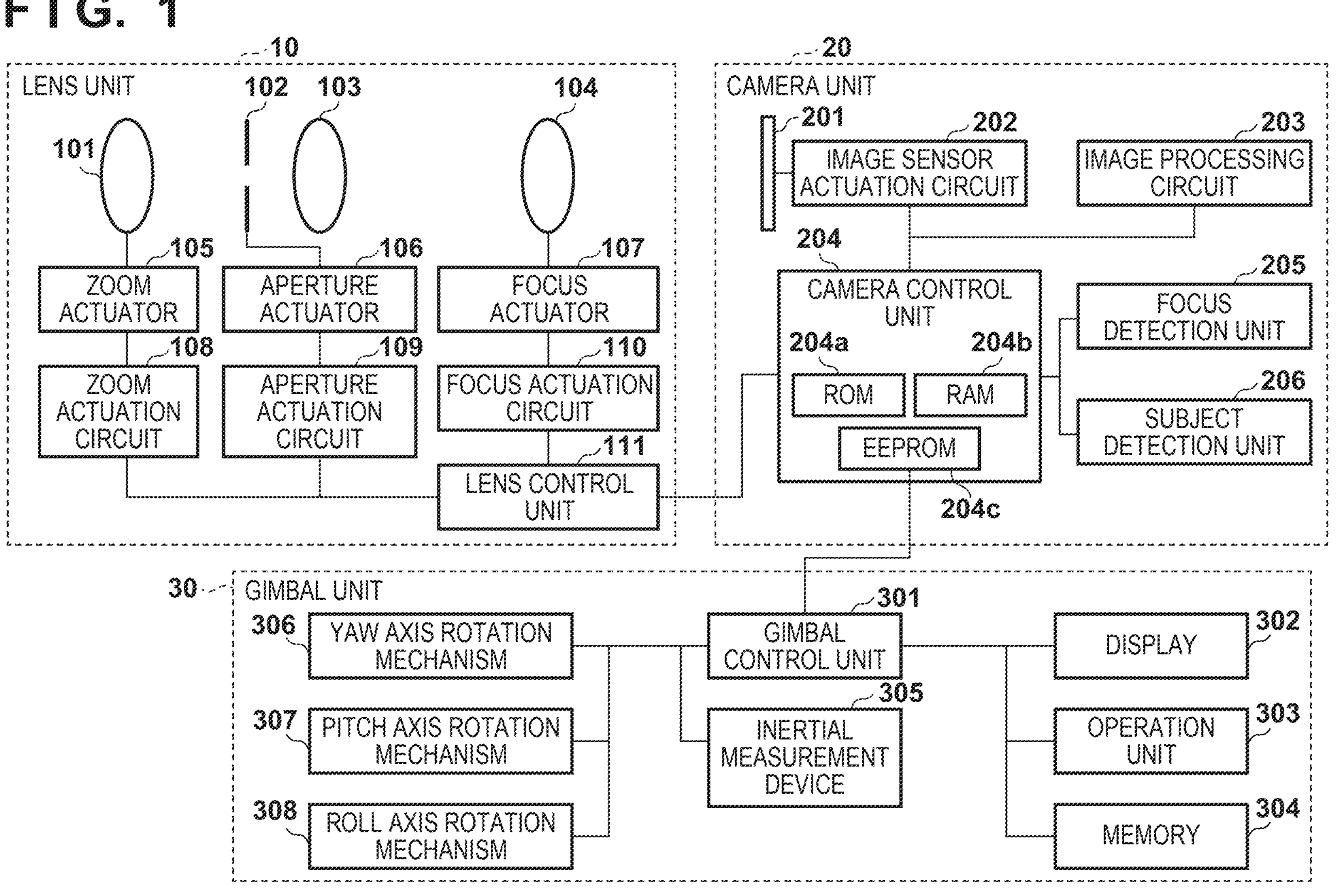
F I G. 1
10
LENS UNIT
101
102
103
104
105
ZOOM ACTUATOR
106
APERTURE ACTUATOR
107
FOCUS ACTUATOR
108
ZOOM ACTUATION CIRCUIT
109
APERTURE ACTUATION CIRCUIT
110
FOCUS ACTUATION CIRCUIT
111
LENS CONTROL UNIT
20
CAMERA UNIT
201
202
IMAGE SENSOR ACTUATION CIRCUIT
203
IMAGE PROCESSING CIRCUIT
204
CAMERA CONTROL UNIT
204a
ROM
204b
RAM
EEPROM
204c
205
FOCUS DETECTION UNIT
206
SUBJECT DETECTION UNIT
30
GIMBAL UNIT
306
YAW AXIS ROTATION MECHANISM
307
PITCH AXIS ROTATION MECHANISM
308
ROLL AXIS ROTATION MECHANISM
301
GIMBAL CONTROL UNIT
305
INERTIAL MEASUREMENT DEVICE
302
DISPLAY
303
OPERATION UNIT
304
MEMORY F I G. 3
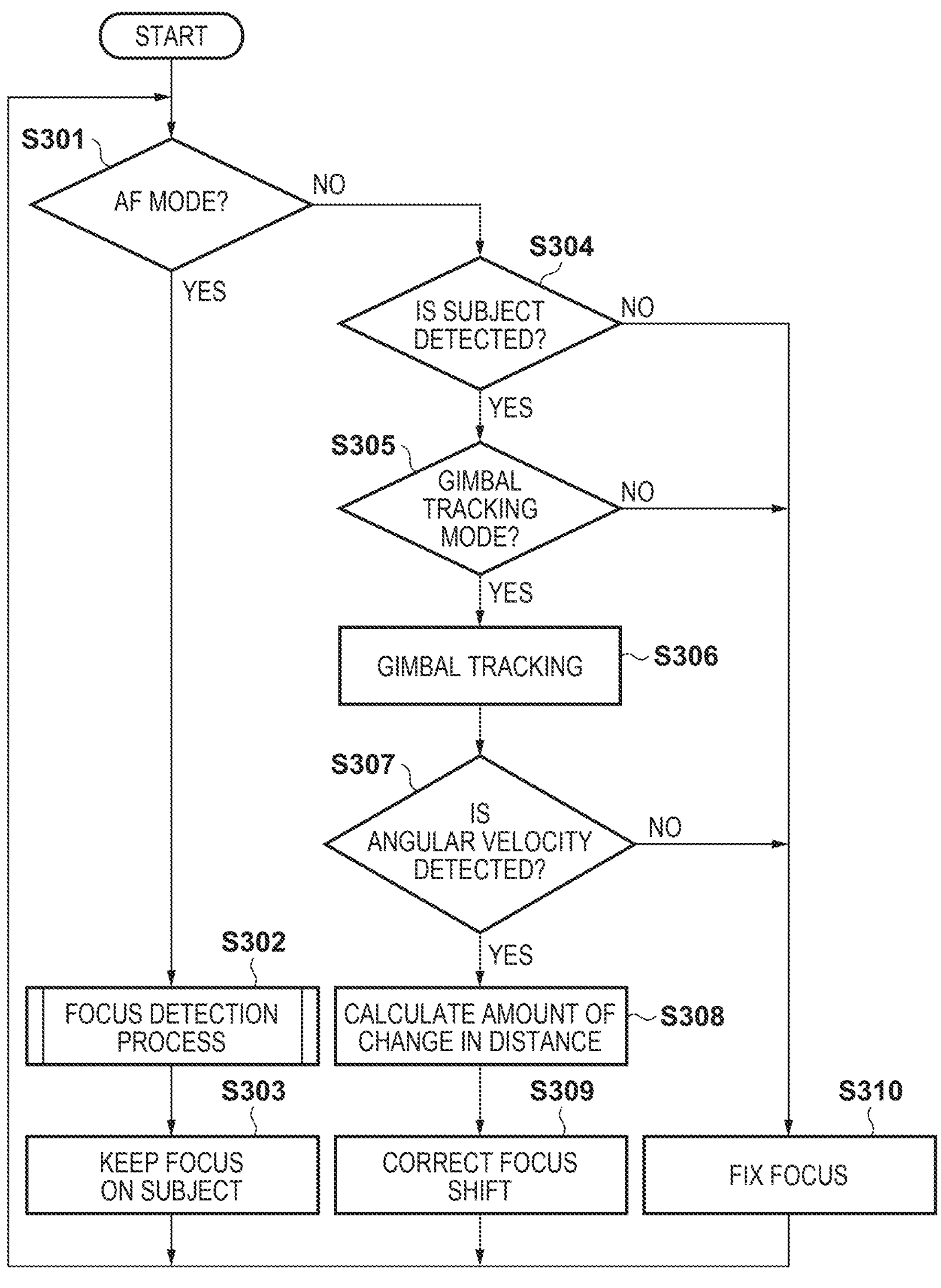

F I G. 7
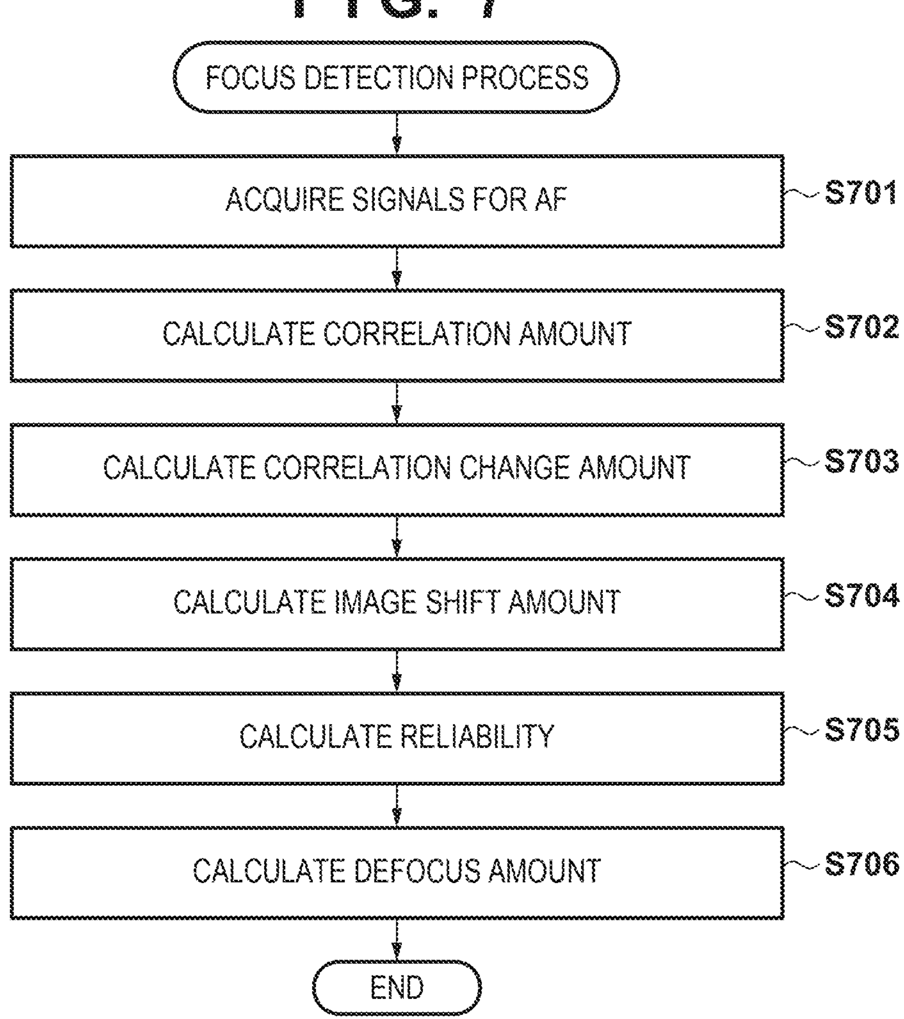
F I G. 8
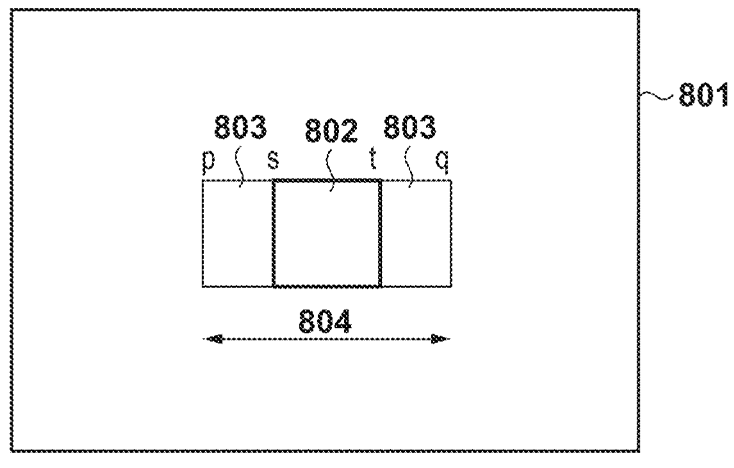

FOCUS ADJUSTMENT APPARATUS AND METHOD, IMAGE CAPTURING APPARATUS, IMAGE CAPTURING SYSTEM, AND STORAGE MEDIUM

BACKGROUND OF THE INVENTION

Field of the Invention

The present invention relates to a focus adjustment apparatus and method, an image capturing apparatus, an image capturing system, and a storage medium.

Description of the Related Art

Conventionally, there are cases where image capturing apparatuses are mounted on gimbals that can rotate in pan/tilt/roll directions when shooting images. Such image capturing apparatuses mounted on gimbals often have a function for tracking a main subject detected by the image capturing apparatuses by controlling the gimbal's movable part so as to keep tracking the main subject (hereinafter referred to as "gimbal tracking").

On the other hand, particularly upon shooting a moving image, there is a need to be able to fix the focus using manual focus in a case where autofocus is not effective in low brightness or low contrast conditions, or in a case where a user does not want to accidentally move the focus.

However, if gimbal tracking and manual focus are combined, a problem arises in that gimbal tracking can unintentionally change the distance between the image capturing apparatus and the subject, resulting in the image being out of focus.

Japanese Patent Laid-Open No. 2009-003208 discloses a method for correcting focus shift in accordance with the amount of movement of the camera while focus is locked.

However, the conventional technology disclosed in Japanese Patent Laid-Open No. 2009-003208 acquires the moving distance of the camera using a three-axis acceleration sensor after autofocusing instructed by half-pressing of the shutter button, and performs focus correction when shooting still images. Therefore, it cannot handle focus correction when shooting moving images, where a user wants to keep the focus on a subject.

Furthermore, although the three-axis acceleration sensor makes it possible to calculate the linear moving distance of the camera, it is not possible to calculate the change in the distance to a subject that accompanies the arc motion caused by gimbal tracking (the so-called cosine error).

SUMMARY OF THE INVENTION

The present invention has been made in consideration of the above situation, and suppresses unintentional focus shift due to gimbal tracking, particularly in moving image shooting.

According to the present invention, provided is a focus adjustment apparatus comprising one or more processors and/or circuitry which function as: a first detection unit that detects a rotation angle of a holding unit that holds an imaging unit including an image sensor and an optical system including a focus lens and that has a rotation unit that rotates the imaging unit; a focus adjustment unit that controls a position of the focus lens to perform focus adjustment; and a calculation unit that, in a case where a rotation angle of the holding unit is detected by the first detection unit, calculates a correction amount for correcting a shift of an in-focus position according to a change amount of a distance between the imaging unit and a subject on which the focus adjustment is performed corresponding to the rotation angle, wherein the focus adjustment unit is capable of performing focus adjustment in an autofocus (AF) mode that focuses on the subject based on a signal obtained from the image sensor, the calculation unit calculates the correction amount in a case where the focus adjustment is not performed in the AF mode and the subject is tracked using the rotation unit, and the focus adjustment unit controls the position of the focus lens based on the correction amount.

Further, according to the present invention, provided is an image capturing apparatus comprising: a focus adjustment apparatus comprising one or more processors and/or circuitry which function as: a first detection unit that detects a rotation angle of a holding unit that holds an imaging unit including an image sensor and an optical system including a focus lens and that has a rotation unit that rotates the imaging unit; a focus adjustment unit that controls a position of the focus lens to perform focus adjustment; and a calculation unit that, in a case where a rotation angle of the holding unit is detected by the first detection unit, calculates a correction amount for correcting a shift of an in-focus position according to a change amount of a distance between the imaging unit and a subject on which the focus adjustment is performed corresponding to the rotation angle; and the imaging unit; and the holding unit, wherein the focus adjustment unit is capable of performing focus adjustment in an autofocus (AF) mode that focuses on the subject based on a signal obtained from the image sensor, the calculation unit calculates the correction amount in a case where the focus adjustment is not performed in the AF mode and the subject is tracked using the rotation unit, and the focus adjustment unit controls the position of the focus lens based on the correction amount.

Furthermore, according to the present invention, provided is an image capturing system comprising: a focus adjustment apparatus comprising one or more processors and/or circuitry which function as: a first detection unit that detects a rotation angle of a holding unit that holds an imaging unit including an image sensor and an optical system including a focus lens and that has a rotation unit that rotates the imaging unit; a focus adjustment unit that controls a position of the focus lens to perform focus adjustment; and a calculation unit that, in a case where a rotation angle of the holding unit is detected by the first detection unit, calculates a correction amount for correcting a shift of an in-focus position according to a change amount of a distance between the imaging unit and a subject on which the focus adjustment is performed corresponding to the rotation angle; the imaging unit; and the holding unit, wherein the focus adjustment unit is capable of performing focus adjustment in an autofocus (AF) mode that focuses on the subject based on a signal obtained from the image sensor, the calculation unit calculates the correction amount in a case where the focus adjustment is not performed in the AF mode and the subject is tracked using the rotation unit, and the focus adjustment unit controls the position of the focus lens based on the correction amount, and the imaging unit is detachable from the holding unit.

Further, according to the present invention, provided is a focus adjustment method comprising: detecting a rotation angle of a holding unit that holds an imaging unit including an image sensor and an optical system including a focus lens and that has a rotation unit that rotates the imaging unit; controlling a position of the focus lens to perform focus adjustment; determining whether or not focus adjustment is performed in an autofocus (AF) mode that focuses on a subject based on a signal obtained from the image sensor; calculating a correction amount for correcting a shift of an in-focus position according to a change amount of a distance between the imaging unit and the subject on which the focus adjustment is performed corresponding to the detected rotation angle in a case where the focus adjustment is not performed in the AF mode and the subject is tracked using the rotation unit, and correcting the position of the focus lens based on the correction amount.

Further, according to the present invention, provided is a non-transitory computer-readable storage medium, the storage medium storing a program that is executable by the computer, wherein the program includes program code for causing the computer to function as a focus adjustment apparatus comprising: a first detection unit that detects a rotation angle of a holding unit that holds an imaging unit including an image sensor and an optical system including a focus lens and that has a rotation unit that rotates the imaging unit; a focus adjustment unit that controls a position of the focus lens to perform focus adjustment; and a calculation unit that, in a case where a rotation angle of the holding unit is detected by the first detection unit, calculates a correction amount for correcting a shift of an in-focus position according to a change amount of a distance between the imaging unit and a subject on which the focus adjustment is performed corresponding to the rotation angle, wherein the focus adjustment unit is capable of performing focus adjustment in an autofocus (AF) mode that focuses on the subject based on a signal obtained from the image sensor, the calculation unit calculates the correction amount in a case where the focus adjustment is not performed in the AF mode and the subject is tracked using the rotation unit, and the focus adjustment unit controls the position of the focus lens based on the correction amount.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram illustrating a functional configuration of an image capturing apparatus according to an embodiment of the present invention.

FIG. 3 is a flowchart of focus adjustment process according to a first embodiment.

FIG. 7 is a flowchart of focus detection process according to the embodiment.

FIG. 8 is a diagram showing an AF area used in the focus detection process according to the embodiment.

DESCRIPTION OF THE EMBODIMENTS

Figure 2A:
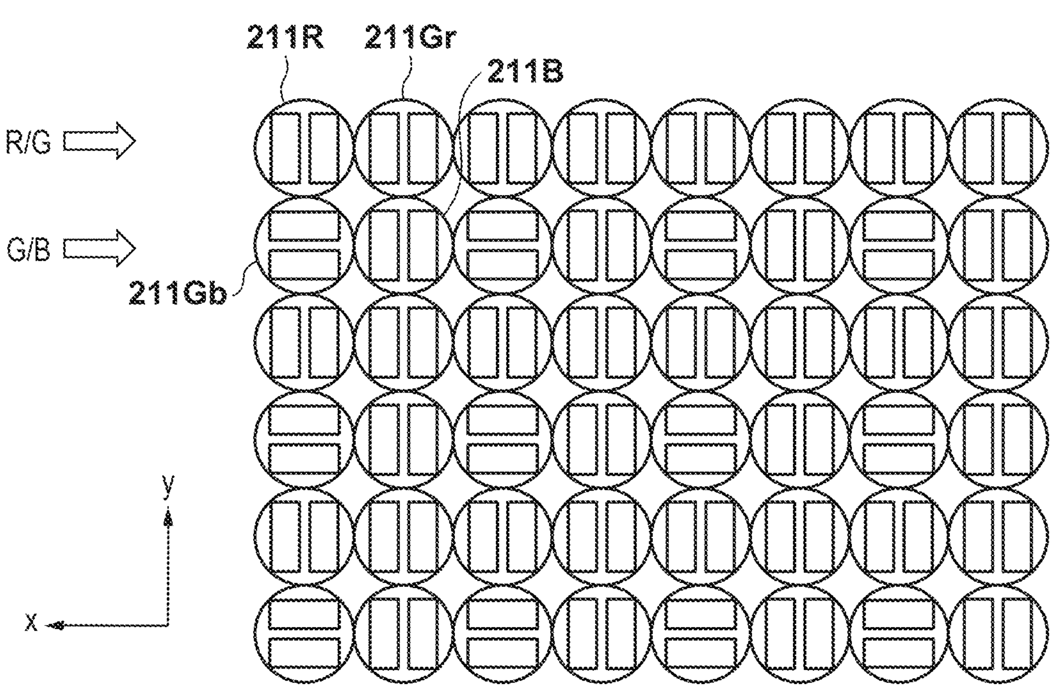
FIGS. 2A and 2B are schematic plan views of an image sensor according to the embodiment as viewed from the lens unit side.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram showing an example of the functional configuration of a digital camera as an example of an image capturing apparatus according to this embodiment. The digital camera of this embodiment is a lens-integrated camera, and has a lens unit 10, which is an imaging optical system, and a camera unit 20, which captures images. Furthermore, the digital camera of this embodiment is a gimbal-integrated type, and the lens unit 10 and camera unit 20 (image capturing unit) are mounted on a gimbal unit 30.

In this description, the lens unit 10, the camera unit 20, and the gimbal unit 30 are assumed to be integrally configured, but the present invention is not limited to this, and may form an image capturing system in which a part or all of these components are separable. In that case, when each component is connected, a connectable signal line for exchanging information with each other should be prepared. Also, a part of the components of the gimbal unit 30 shown below may be configured in the camera unit 20.

In addition, in this embodiment, a digital camera is used as an example of an image capturing apparatus, but any electronic device having a camera function may be used, and it may be, for example, another camera such as a digital video camera, a camera-equipped mobile phone, a camera-equipped computer, a game console, etc.

(Lens Unit 10)

The lens unit 10 is an imaging lens that has an optical system including a first lens group 101, an aperture 102, a second lens group 103, and a focus lens group (hereafter simply referred to as "focus lens") 104, as well as an actuation/control system, and forms an optical image of a subject.

The first lens group 101 is disposed at the tip of the lens unit 10 and is held movable in the optical axis direction. The aperture 102 has a function of adjusting the amount of light during shooting by adjusting its aperture diameter. The aperture 102 and the second lens group 103 are integrally movable in the optical axis direction, and a zoom function is realized by moving in conjunction with the first lens group 101. The focus lens 104 is also movable in the optical axis direction, and the distance to the subject on which the lens unit 10 focuses (focusing distance) changes depending on the position of the focus lens 104 in the optical axis direction. Focus adjustment is performed to adjust the focusing distance of the lens unit 10 by controlling the position of the focus lens 104 in the optical axis direction.

The actuation/control system includes a zoom actuator 105, an aperture actuator 106, and a focus actuator 107. It also includes a zoom actuation circuit 108, an aperture actuation circuit 109, a focus actuation circuit 110, and a lens control unit 111.

The zoom actuation circuit 108 actuates the zoom actuator 105 to actuate the first lens group 101 and the second lens group 103 in the optical axis direction, thereby controlling the angle of view of the optical system of the lens unit 10. The aperture actuation circuit 109 actuates the aperture 102 using the aperture actuator 106 to control the aperture diameter of the aperture 102. The focus actuation circuit 110 actuates the focus lens 104 in the optical axis direction using the focus actuator 107 to change the focusing distance of the optical system of the lens unit 10. The focus actuation circuit 110 also detects the current position of the focus lens 104 using the focus actuator 107.

The lens control unit 111 controls the zoom actuation circuit 108, the aperture actuation circuit 109, and the focus actuation circuit 110. The lens control unit 111 also communicates with a camera control unit 204. For example, the lens control unit 111 acquires the position of the focus lens 104 on the optical axis in response to a request from the camera control unit 204, and notifies the camera control unit 204 of focus lens position information. The lens control unit 111 also controls the zoom actuation circuit 108, the aperture actuation circuit 109, and the focus actuation circuit 110 in response to a processing command from the camera control unit 204.

(Camera Unit 20)

The camera unit 20 has an image sensor 201 and controls the entire camera including the lens unit 10 and the gimbal unit 30.

In this embodiment, the image sensor 201 is composed of a CMOS image sensor and peripheral circuits, and has m pixels arranged horizontally and n pixels arranged vertically (m and n are integers of 2 or more). Furthermore, the image sensor 201 in this embodiment has a pupil division structure and phase difference autofocus (AF) can be performed using image data.

Here, the configuration of the image sensor 201 in this embodiment will be explained.

FIG. 2A is a schematic diagram of the pixel array of the image sensor 201 in this embodiment, showing an area of six vertical rows (Y direction) and eight horizontal columns (X direction) of a two-dimensional CMOS area sensor observed from the lens unit 10 side. The image sensor 201 is provided with color filters in a Bayer array, with red (R) and green (G) color filters arranged alternately from left to right in the odd-numbered rows of pixels, and green (G) and blue (B) color filters arranged alternately from left to right in the even-numbered rows of pixels.

Figure 2B:
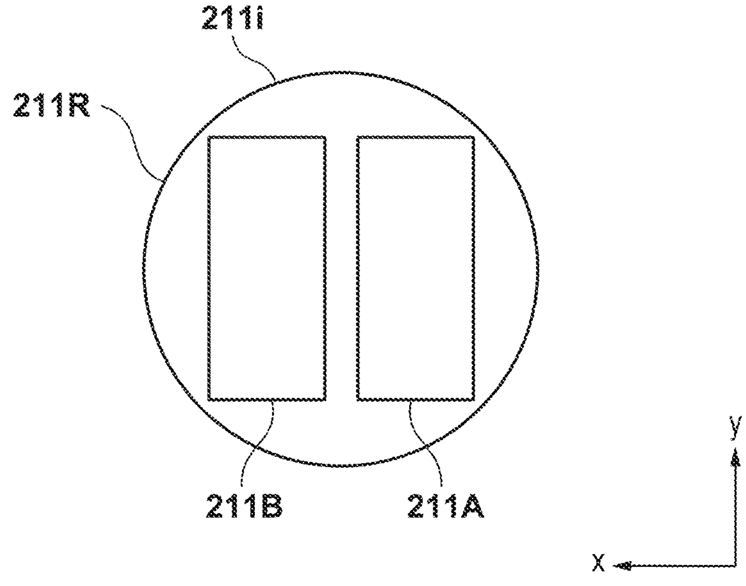

FIG. 2B is a diagram showing a pixel 211R, in which a circle 211*i* represents an on-chip microlens, and a plurality of rectangles 211A and 211B arranged inside the on-chip microlens 211*i* each represent a photoelectric conversion unit. The pixels 211Gr, 211Gb, and 211B each have a similar configuration.

Furthermore, in the image sensor 201 of this embodiment, there are pixels (211R, 211Gr, 211Gb, 211B) each having two separate photoelectric conversion units placed side by side in the X direction. Photoelectrically converted signals corresponding to the individual photoelectric conversion units can be used as data for phase difference AF, or can be used to generate parallax images that form a three-dimensional (3D) image. Furthermore, the sum of the photoelectrically converted signals can be used as normal captured image data.

Here, a pixel signal when performing phase difference AF will be described. In this embodiment, in the configuration shown in FIG. 2B, the microlens 211*i* and the separate photoelectric conversion unit 211A and photoelectric conversion unit 211B are configured to be able to realize pupil division of the light passing through the imaging optical system. By using the photoelectric conversion unit 211A and the photoelectric conversion unit 211B in FIG. 2B as a pair, it is possible to perform focus detection based on the image shift amount (phase difference) in the X direction.

More specifically, in FIG. 2A, signals from photoelectric conversion units 211A arranged in a plurality of pixels 211R, 211Gr, 211Gb, and 211B within a predetermined range arranged in the same pixel row are collected to generate an A image signal for AF. Similarly, signals from photoelectric conversion units 211B are collected to generate a B image signal for AF, thereby generating a pair of image signals. At this time, the outputs of photoelectric conversion units 211A and 211B use pseudo luminance (Y) signals calculated by adding together the outputs of green, red, blue, and green included in each unit of the Bayer color filters. However, the A and B image signals for AF may be generated for each of the colors of red, blue, and green.

The A and B image signals thus generated are subjected to a correlation calculation as described below, and the image shift amount [bit] can be calculated based on the obtained correlation amount. The camera control unit 204 can detect the defocus amount [mm] of a predetermined area by multiplying the obtained image shift amount by a conversion coefficient.

In the above example, the two photoelectric conversion units of the pixel are separated in the X direction, but the present invention is not limited to this. For example, the photoelectric conversion units may be separated in the Y direction, or pixels having photoelectric conversion units separated in both the X direction and the Y direction may be mixed. There are various other methods of separating the photoelectric conversion units, but since known techniques can be used, detailed explanations will be omitted here.

Returning to the explanation of FIG. 1, an image sensor actuation circuit 202 controls the operation of the image sensor 201, performs A/D conversion and gain processing on the acquired image signal and signals for phase difference AF, and transmits the result to the camera control unit 204.

An image processing circuit 203 performs image processing generally performed in digital cameras, such as gamma conversion, white balance adjustment, color interpolation, compression encoding, etc., on the image signal output from the image sensor actuation circuit 202. Then, the image processing circuit 203 generates image data for recording, an image signal for display, and a pair of image signals (an A image signal and a B image signal) for phase difference AF.

Furthermore, the camera control unit 204 performs all calculations and control related to the camera unit 20, and controls the image sensor actuation circuit 202 and the image processing circuit 203.

As one of its functions, the camera control unit 204 performs photometry using the image signal output from the image sensor actuation circuit 202, and adjusts the aperture diameter of the aperture 102, the exposure period of the image sensor 201, and the gain value in the image sensor actuation circuit 202 based on the obtained photometry value. Note that photometry may be performed using an independent photometer instead of using the image signal.

In addition, the camera control unit 204 sends to the lens control unit 111 a request to obtain the focus lens position, a request to change the aperture 102, the focus lens 104, and the zoom magnification at predetermined actuation amounts, and a request to obtain optical information specific to the lens unit 10.

The camera control unit 204 includes a read only memory (ROM) 204*a* that stores a program for controlling the camera operation, a random access memory (RAM) 204*b* that stores variables, and an electrically erasable programmable read-only memory EEPROM) 204*c* that stores various parameters and various setting information for the camera unit 20 set by the user.

The camera control unit 204 also receives control commands for the lens control unit 111 and processing commands from the user via an operation unit 303 via a gimbal control unit 301 of the gimbal unit 30 in order to change the operations of the image sensor actuation circuit 202 and the image processing circuit 203. Also, via the gimbal control unit 301, the camera control unit 204 displays an image signal on a display 302 and records an image signal in a memory 304.

A focus detection unit 205 performs focus detection processing by a phase difference detection method using a pair of image signals (A image signal and B image signal) for phase difference AF obtained by the image processing circuit 203, and detects a defocus amount based on a shift amount between the A image signal and the B image signal. The camera control unit 204 performs focus adjustment by adjusting the position of the focus lens 104 via the lens control unit 111 so as to reduce the defocus amount.

A subject detection unit 206 performs subject detection based on image data obtained by the image processing circuit 203. In this embodiment, the subject detection, which estimates a target subject and detects the position of the subject in the image data, is used to select one of the focus adjustment results by the focus detection unit 205, the selected result being used by the camera control unit 204 to actuate the focus lens 104 via the lens control unit 111. The subject to be detected may be, for example, a person's face and the pupils contained therein, an animal's body and the face/pupils contained therein, or the entire vehicle and characteristic parts contained therein (such as the driver or cockpit of the vehicle), but is not limited to these. In addition, a subject present at a position specified by the user by the user's touch operation on the display 302, etc. in the screen may be detected.

(Gimbal Unit 30)

The gimbal unit 30 has the gimbal control unit 301, the display 302, the operation unit 303, the memory 304, an inertial measurement device 305, a yaw axis rotation mechanism 306, a pitch axis rotation mechanism 307, and a roll axis rotation mechanism 308.

The gimbal control unit 301 controls the operation of each part of the gimbal unit 30. It also exchanges information with the camera control unit 204, and provides information to change the operation of the image sensor actuation circuit 202 and the image processing circuit 203. It can also control the zoom actuation circuit 108, the aperture actuation circuit 109, and the focus actuation circuit 110 via the camera control unit 204 and the lens control unit 111. It also receives an image signal for display from the camera control unit 204, and displays it on the display 302 and records it in the memory 304.

The display 302 is composed of a liquid crystal display (LCD) and the like, and displays information regarding the camera's shooting mode, a preview image before shooting and a confirmation image after shooting, an image showing the focus state during focus detection, and the like.

The operation unit 303 is composed of a power switch, a focus adjustment start switch, a shooting trigger switch, a zoom operation switch, a gimbal operation switch, a touch panel formed on the display 302, and the like. By operating the operation unit 303, it is possible to switch between an AF mode and an MF mode, and to give an instruction to actuate the focus lens 104 in the MF mode. Also, it is possible to perform various operations by selecting various functional icons and image areas displayed on the display 302 via the touch panel.

The memory 304 is a removable flash memory that records image data obtained by shooting.

The inertial measurement device 305 has an acceleration sensor and a gyro sensor, and detects the acceleration in three axial directions, i.e., forward/backward, left/right, and up/down, of the entire image capturing apparatus including the lens unit 10, camera unit 20, and gimbal unit 30. It also detects angular velocity in three axial directions, i.e., the yaw axis, pitch axis, and roll axis. The rotation angle can be obtained by integrating the detected angular velocity over time.

The yaw axis rotation mechanism 306 has a yaw axis motor that rotates the lens unit 10 and camera unit 20 in the yaw axis direction.

The pitch axis rotation mechanism 307 has a pitch axis motor that rotates the lens unit 10 and camera unit 20 in the pitch axis direction.

The roll axis rotation mechanism 308 has a roll axis motor that rotates the lens unit 10 and camera unit 20 in the roll axis direction.

Figures 4A, 4B, 4C:
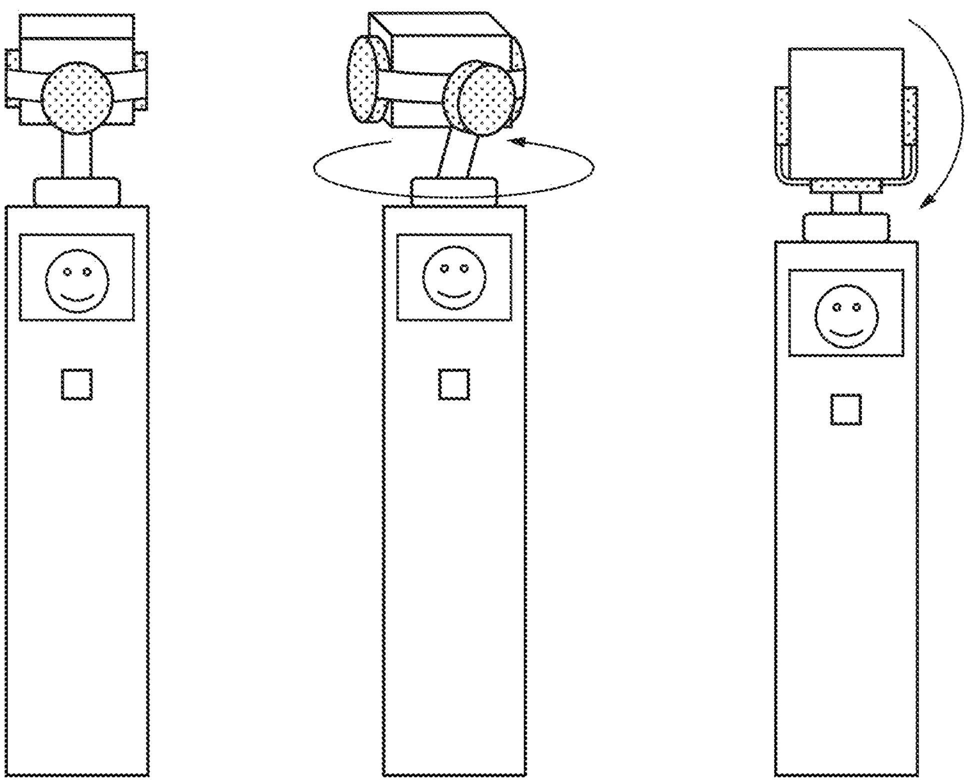
FIGS. 4A to 4C are explanatory diagrams of gimbal tracking in the embodiment.

The gimbal control unit 301 controls the yaw axis rotation mechanism 306, pitch axis rotation mechanism 307, and roll axis rotation mechanism 308 to suppress camera shake caused by the photographer when shooting an image. When the photographer issues a command to actuate the yaw axis rotation mechanism 306, pitch axis rotation mechanism 307, and roll axis rotation mechanism 308, in response to the operation of a gimbal operation switch included in the operation unit 303, the gimbal control unit 301 performs control according to the command. When gimbal tracking is set, the gimbal control unit 301 controls the yaw axis rotation mechanism 306, pitch axis rotation mechanism 307, and roll axis rotation mechanism 308 and performs framing so that the subject detected by the subject detection unit 206 is located within the imaging screen. The gimbal tracking refers to an operation of controlling the yaw axis rotation mechanism 306 or the pitch axis rotation mechanism 307 to automatically change the orientation of the lens unit 10 and the camera unit 20 so as to bring the main subject within the shooting angle of view when the main subject is detected by the subject detection unit 206, even if the photographer changes the framing by moving the camera unit 20 in any direction, for example, as shown in FIGS. 4A to 4B or FIGS. 4A to 4C.

(Focus Adjustment Process)

Next, the focus adjustment process in this embodiment will be described. Note that the focus adjustment process described below is performed by the camera control unit 204 in the camera unit 20 executing an image processing program stored in the ROM 204*a*.

FIG. 3 is a flowchart showing the focus adjustment process. Note that, although the focus adjustment process during moving image shooting will be described in this embodiment, it may be performed during LV operation during still image shooting.

First, in step S301, the camera control unit 204 determines whether or not the AF mode is set by an operation of the operation unit 303 or a touch operation on the display 302 via the gimbal control unit 301. If the AF mode is set, the process proceeds to step S302, and if not, the process proceeds to step S304.

In step S302, the camera control unit 204 causes the focus detection unit 205 to perform a focus detection process. In the focus detection process, information on the defocus amount and reliability for performing on-imaging plane phase difference AF are acquired. The area in the image screen for acquiring a pair of image signals for phase difference AF is set according to the state of the camera unit 20. Details of the focus detection process performed here will be described later.

Next, in step S303, the camera control unit 204 controls the focus lens 104 based on the defocus amount calculated in the focus detection process in step S302, performs AF control to keep the focus on the subject, and then returns to step S301. This makes it possible to continue to maintain focus on an arbitrary subject while the AF mode is set.

On the other hand, if the AF mode is not set, the manual focus (MF) mode is assumed to be set, and the process in step S304 and subsequent processes is performed. First, in step S304, the camera control unit 204 determines whether or not a specific subject (main subject) such as a person's face is detected by the subject detection unit 206, and if the subject is detected, the process proceeds to step S305, and if not, the process proceeds to step S310. The main subject can be determined by pressing a shooting direction switching button on the operation unit 303, touching a shooting direction switching icon on the touch panel of the display 302, or the like, but other methods may also be used.

If a subject is detected, in step S305, the camera control unit 204 determines via the gimbal control unit 301 whether a gimbal tracking mode is enabled by an operation of the operation unit 303 or a touch operation on the display 302. If the gimbal tracking mode is enabled, the process proceeds to step S306, and if not, the process transitions to step S310.

If the gimbal tracking mode is enabled, in step S306, the camera control unit 204 causes the gimbal tracking to be performed via the gimbal control unit 301.

Next, in step S307, the camera control unit 204 determines whether or not the angular velocity in the yaw direction and/or pitch direction of the camera unit 20 is detected by the inertial measurement device 305 during the gimbal tracking, and the process transitions to step S308 if the angular velocity is detected, and transitions to step S310 if not.

When the photographer moves the camera unit 20 in the yaw or pitch direction, for example, from FIG. 4A to FIG. 4B or from FIG. 4A to FIG. 4C, an arc motion (rotation) occurs around the photographer, and strictly speaking, the distance between camera unit 20 and the subject changes.

Figure 5:
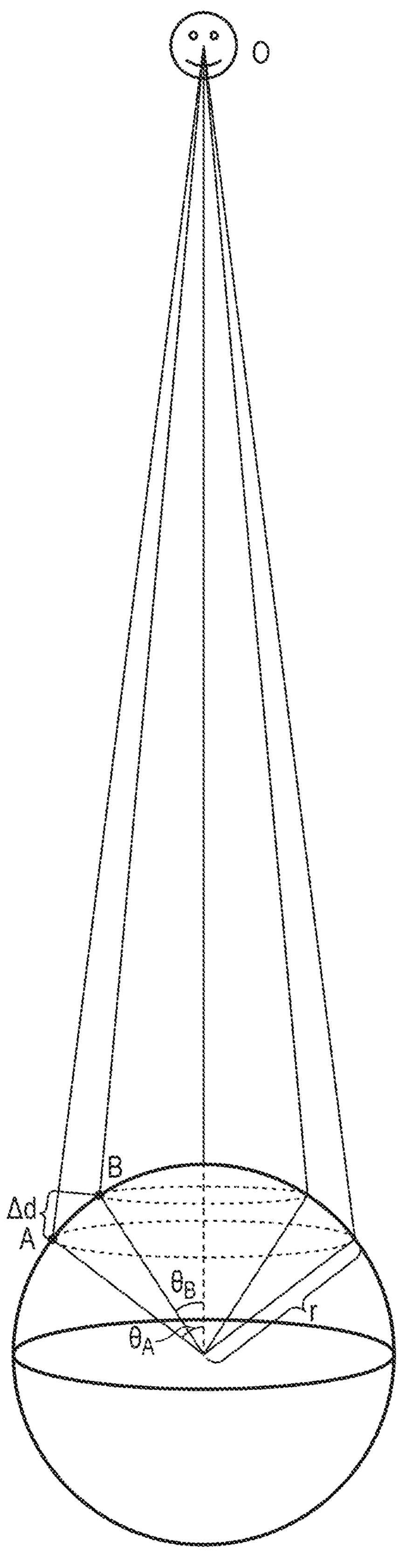
FIG. 5 is an explanatory diagram of focus shift due to gimbal tracking according to the embodiment.

FIG. 5 is a diagram for explaining the relationship between the position of the camera unit 20 before and after the occurrence of the arc motion (rotation) and the distance to the subject. In a sphere with a radius equal to the length r of the grip including the gimbal unit 30, when the camera moves from position A on the surface of the sphere with a declination angle $\theta_A$ to position B on the surface of the sphere with a declination angle $\theta_B$, a difference of Δd (=distance OA-distance OB) occurs with respect to the distance to a subject O. Thus, in the MF mode where shooting is performed with the focus fixed, the problem of the focus being shifted due to the arc motion occurs.

Therefore, if an angular velocity is detected, in step S308, the camera control unit 204 calculates the amount of change Δd to correct the focus shift caused by the arc motion of the camera unit 20. Here, a method for calculating the amount of change Δd will be described in detail with reference to FIGS. 6A and 6B. As described above, the amount of change Δd can be expressed by equation (1). Note that in the following equations, the distance OA is represented as (OA) and the distance OB is represented as (OB).

$$\Delta d = (OA) - (OB) \tag{1}$$

The distance OA is the distance to the subject which is in-focus, so it can be calculated from the image shift amount, the defocus amount, the position of the focus lens 104, and so on. Therefore, if the distance OB is known, Δd can be calculated.

Figure 6A:
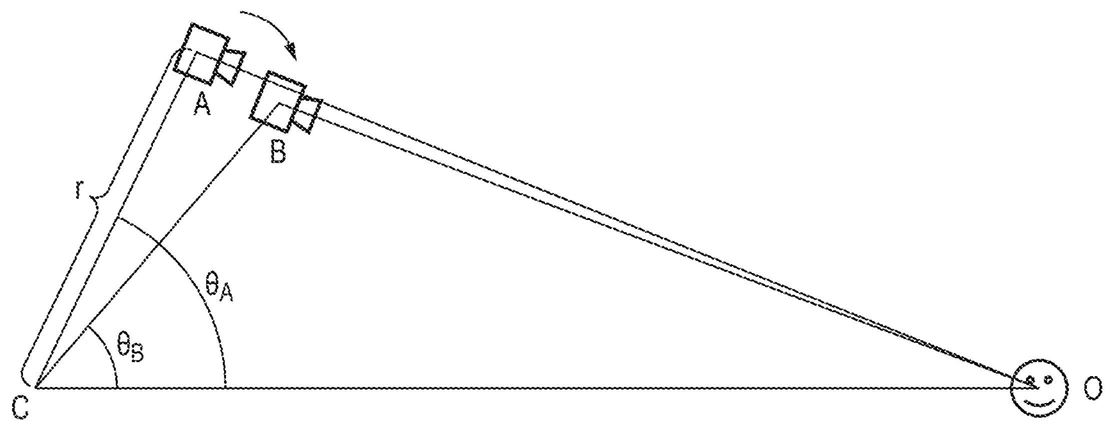
FIGS. 6A and 6B are explanatory diagrams of correcting focus shift due to gimbal tracking according to the embodiment.

Here, as shown in FIG. 6A, in a triangle formed by the subject O, the center C of the arc motion, and the camera position B after the motion, the distance OB can be expressed as follows according to the cosine theorem using the lengths of respective sides and angles.

$$(OB)^2 = (BC)^2 + (OC)^2 - 2(BC)(OC)\cos\theta_B \tag{2}$$

Figure 6B:
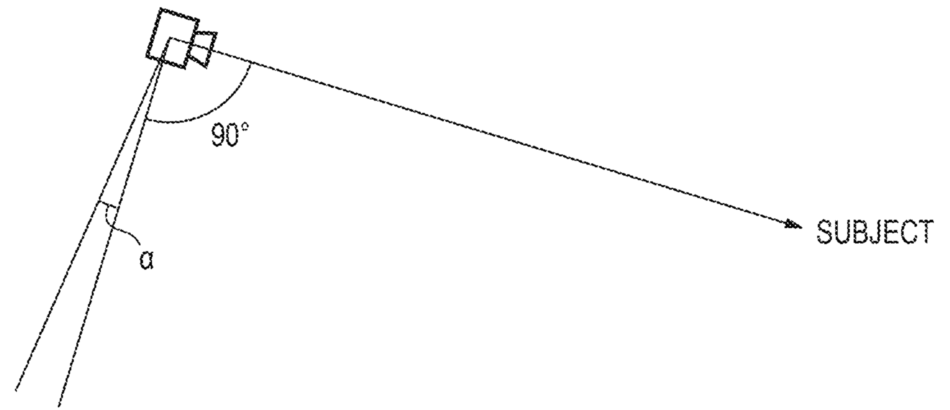

Of the terms in the above equation (2), (BC) is r, and (OC) can be calculated in advance from the triangle OAC by the cosine theorem if the angle CAO is known. As shown in FIG. 6B, the camera unit 20 faces the subject directly due to gimbal tracking, so the angle CAO can be obtained by adding 90° to the angle α between the camera unit 20 and the gimbal unit 30, which is obtained from the yaw axis rotation mechanism 306 and the pitch axis rotation mechanism 307 when the camera unit 20 is at position A. The deflection angle $\theta_B$ at position B after the movement can be obtained by time integration of the angular velocity obtained from the inertial measurement device 305.

Substituting the equation (2) into the equation (1), $$\Delta d = (OA) - \sqrt{\left((BC)^2 + (OC)^2 - 2(BC)(OC)\cos\theta_B\right)} \tag{3}$$

can be obtained. Accordingly, the change in distance to the subject, Δd can be obtained.

Next, in step S309, the camera control unit 204 converts the amount of change Δd calculated in step S308 into a focus correction amount, and actuates the focus lens 104 via the lens control unit 111. This makes it possible to correct the focus shift caused by the arc motion of the camera unit 20 during gimbal tracking. Note that since the process shown in FIG. 3 is executed for each frame, it is preferable to actuate the focus lens 104 in synchronization with the control of the yaw axis rotation mechanism 306 and/or the pitch axis rotation mechanism 307 by gimbal tracking in step S306 of the next frame for the focus correction here.

On the other hand, if it is not determined in step S304 that a subject is detected, or if it is not determined in step S305 that the gimbal tracking mode is enabled, or if the angular velocity is not detected in step S307, then in step S310 the camera control unit 204 maintains the focus fixed in accordance with settings in the MF mode.

(Focus Detection Process)

Next, the details of the focus detection process executed by the focus detection unit 205 in step S302 will be described. FIG. 7 is a flowchart illustrating the flow of the focus detection process.

First, in step S701, the camera control unit 204 acquires a pair of image signals for AF from a plurality of pixels included in the focus detection area of the image sensor 201. FIG. 8 shows an example of a focus detection area 802 set on a pixel array 801 of the image sensor 201. Shift areas 803 on both sides of the focus detection area 802 are areas needed for correlation calculation. Therefore, an area 804 combining the focus detection area 802 and the shift areas 803 is a pixel area required for correlation calculation. In FIG. 8, p, q, s, and t each represent a coordinate in the horizontal direction (x-axis direction), p and q represent the x coordinates of the start point and end point of the pixel area 804, respectively, and s and t represent the x coordinates of the start point and end point of the focus detection area 802, respectively.

Figure 9A:
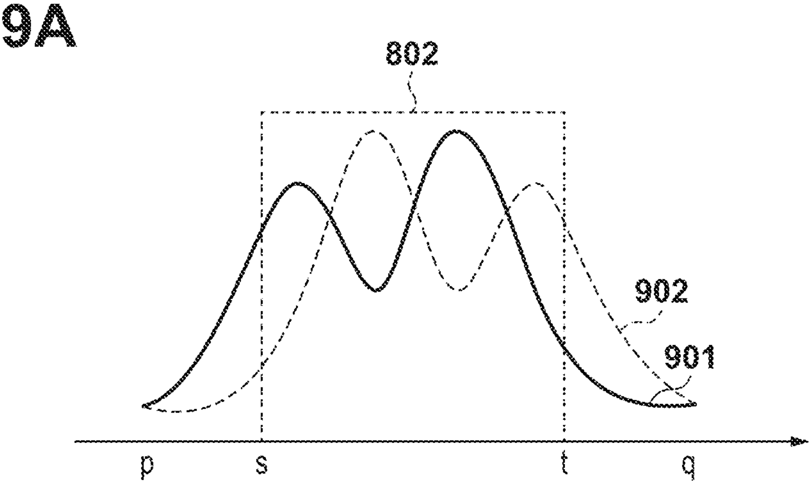
FIGS. 9A to 9C are diagrams showing an example of image signals obtained from an AF area according to the embodiment.
Figure 9B:
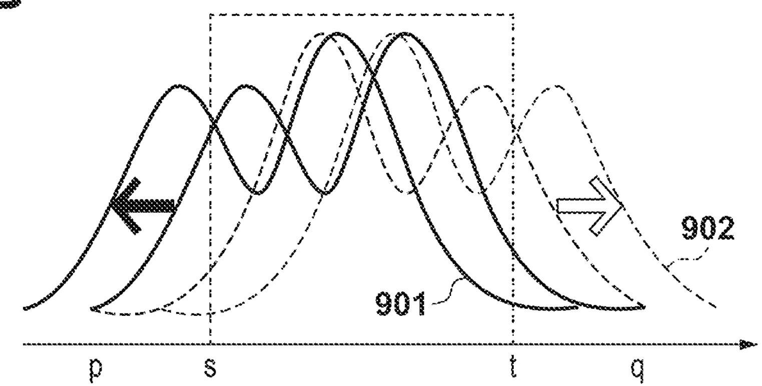
Figure 9C:
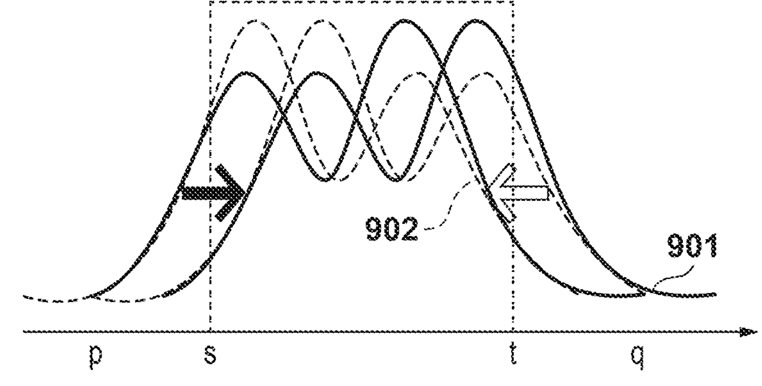

FIG. 9A also shows an example of a pair of image signals for AF obtained based on signals acquired from a plurality of pixels included in the pixel area 804 shown in FIG. 8. A solid line 901 indicates an A image signal, and a dashed line 902 indicates a B image signal. FIG. 9A shows the A image signal 901 and the B image signal 902 before shifting, and FIGS. 9B and 9C show the states after the A image signal 901 and the B image signal 902 are shifted in the positive and negative directions, respectively, from the state shown in FIG. 9A in order to calculate the correlation amount in step S702.

Next, in step S702, the focus detection unit 205 calculates the correlation amount between the pair of acquired image signals while relatively shifting the pair of image signals by one pixel (one bit) at a time. In each of a plurality of pixel lines (hereinafter referred to as "scanning lines") in the focus detection area, as shown in FIGS. 9B and 9C, both the A image signal 901 and the B image signal 902 are shifted by one bit in the directions of arrows, and the sum of the absolute values of the differences between the A image signal 901 and the B image signal 902 in the focus detection area 802 (from s to t) set in each shift state is calculated. Here, the maximum shift amount in the negative direction is p-s, and the maximum shift amount in the positive direction is q-t. Furthermore, if the shift amount is represented by i, x is the start coordinate of the focus detection area 802, and y is the end coordinate of the focus detection area 802, then the correlation amount COR can be calculated by the following equation (4).

$$COR[i]=\sum_{k=x}^{y}|A[k+i]-B[k-i]|\ \{(p-s)<i<(q-t)\} \tag{4}$$

In this way, the correlation amount between the pair of A image signal 901 and B image signal 902 is calculated for each scanning line, and the correlation amounts of the scanning lines are averaged to calculate a single correlation amount.

Although the above description assumes that the pair of image signals are relatively shifted by one pixel in calculating the correlation amount, it is also acceptable to adopt a configuration in which the image signals are relatively shifted by more pixels, for example, by two pixels. Also, it is also acceptable to adopt a configuration in which the correlation amounts of the scanning lines are averaged to calculate one correlation amount, but it is also acceptable to adopt a configuration in which, for example, averages of a pair of image signals of the scanning lines are calculated, and then a correlation amount is calculated using the averaged pair of image signals.

Figure 10A:
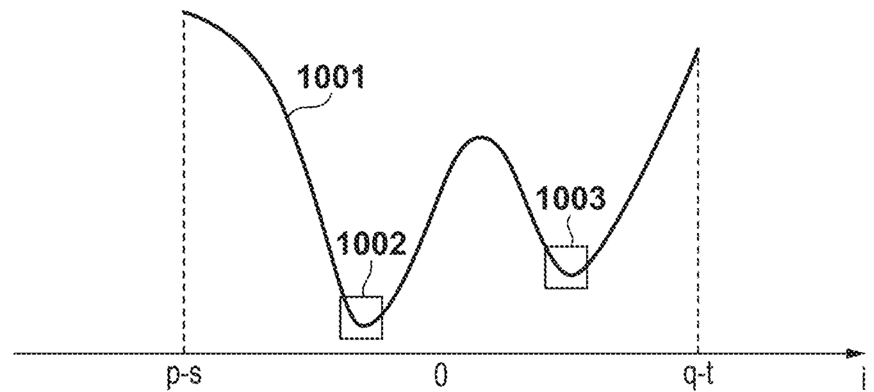
FIGS. 10A and 10B are explanatory diagrams of the relationship between the shift amount and correlation amount of the image signals shown in FIGS. 9A to 9C.

FIG. 10A is a diagram showing an example of the relationship between the shift amount and the correlation amount COR. The horizontal axis represents the shift amount, and the vertical axis represents the correlation amount COR. Of extreme value areas 1002 and 1003 in a correlation amount 1001 that changes with the shift amount, the degree of match between the A image signal and B image signal is highest at a shift amount corresponding to a smaller correlation amount.

Next, in step S703, the focus detection unit 205 calculates a correlation change amount from the correlation amount calculated in step S702. If the difference between the correlation amounts for every other shift in the waveform of the correlation amount 1001 shown in FIG. 10A is calculated as the correlation change amount, and if the shift amount is i, the minimum shift amount is p-s, and the maximum shift amount is q-t, then the correlation change amount ΔCOR can be calculated by the following equation (5).

$$\Delta COR[i]=COR[i-1]-COR[i+1]\ \{(p-s+1)<i<(q-t-1)\} \tag{5}$$

Figure 11A:
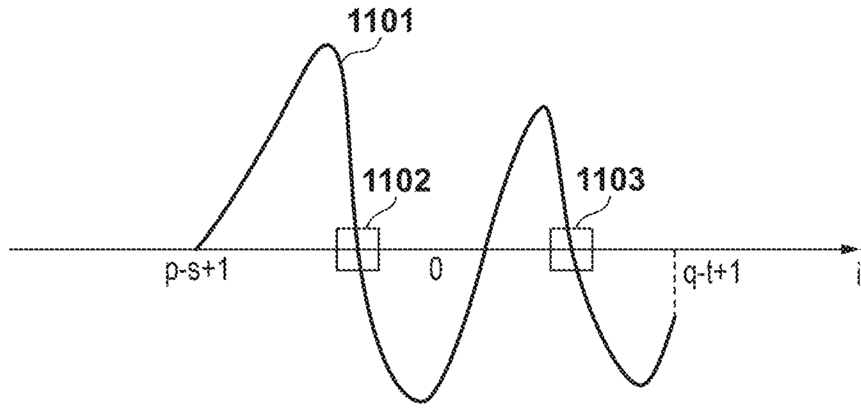
FIGS. 11A and 11B are explanatory diagrams of the relationship between the shift amount of the image signals shown in FIGS. 9A to 9C and correlation change amount.

Next, in step S704, the focus detection unit 205 calculates the image shift amount using the correlation change amount calculated in step S703. FIG. 11A shows an example of the relationship between the shift amount and the correlation change amount ΔCOR, where the horizontal axis represents the shift amount and the vertical axis represents the correlation change amount ΔCOR. A correlation change amount 1101, which changes with the shift amount, goes from positive to negative in portions 1102 and 1103. The state in which the correlation change amount is 0 is called a zero crossing, and in this state, the degree of match between the A image signal and the B image signal is highest. Therefore, the shift amount that gives the zero crossing is the image shift amount.

Figure 11B:
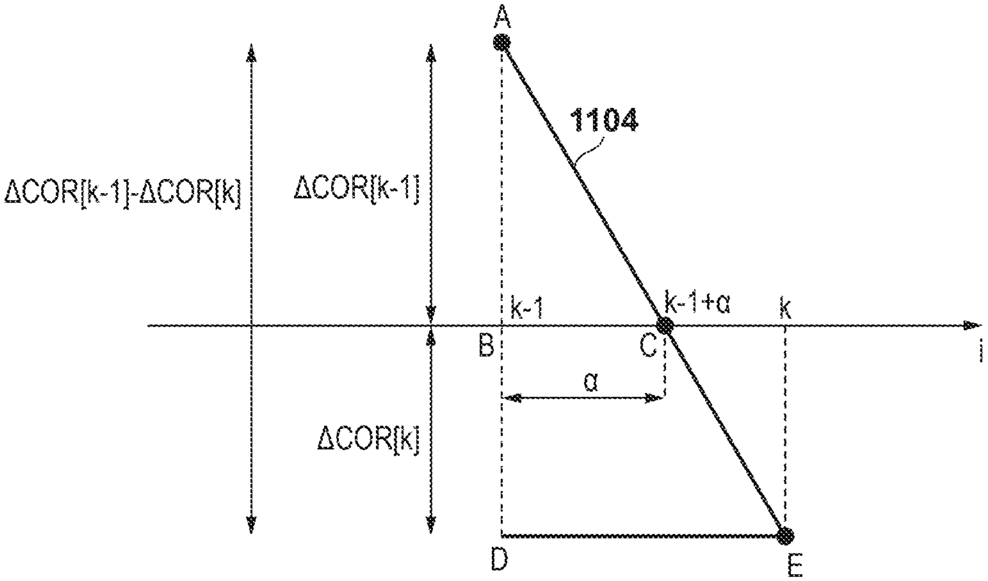

FIG. 11B is an enlarged view of the portion 1102 in FIG. 11A, and a line 1104 is a portion of the correlation change amount 1101. First, the shift amount (k−1+α) that gives a zero crossing is divided into an integer part β(=k−1) and a decimal part α. The decimal part α can be calculated by the following formula (6) from the similarity relationship between triangles ABC and ADE in FIG. 11B.

$$AB:AD=BC:DE \tag{6}$$

$$\Delta COR[k-1]:\Delta COR[k-1]-\Delta COR[k]=\alpha:K-(K-1)$$

$$\alpha=\frac{\Delta COR[k-1]}{\Delta COR[k-1]-\Delta COR[k]}$$

On the other hand, the integer part β can be calculated by the following formula (7) from FIG. 11B $$\beta=K-1 \tag{7}$$

The image shift amount PRD can be calculated from the sum of a and B obtained in the above manner.

Also, if there are a plurality of zero crossings of the correlation change amount ΔCOR as shown in FIG. 11A, the one in which the change in the correlation change amount ΔCOR has a greater steepness in its vicinity is determined as the primary zero crossing. This steepness is an index showing how easily the focusing position can be specified, and the larger the value, the more accurately the focusing position can be specified. The steepness maxder can be calculated by the following formula (8).

$$maxder = |\Delta COR[k-1]| + |\Delta COR[k]| \tag{8}$$

In this way, in this embodiment, if there are a plurality of zero crossings in the correlation change amount, the primary zero crossing is determined based on the steepness of the zero crossings, and the shift amount that gives the primary zero crossing is set as the image shift amount.

Figure 10B:
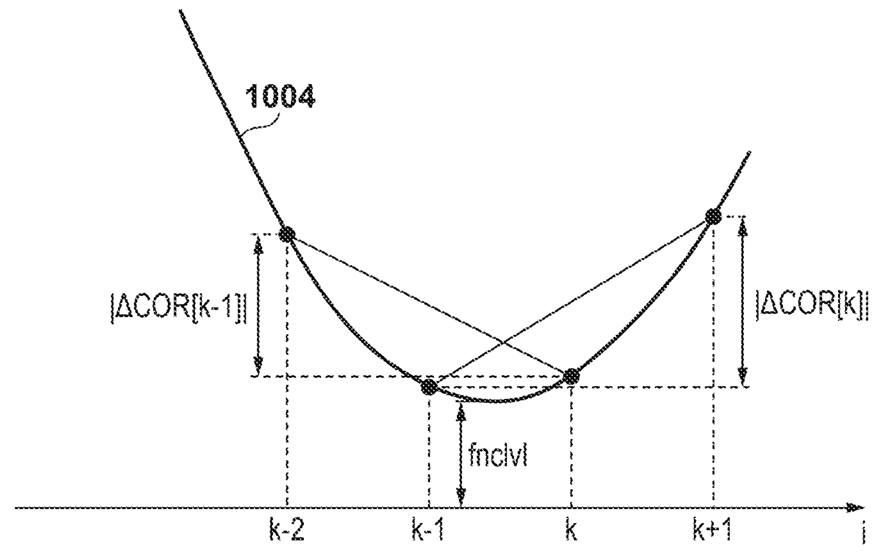

Next, in step S705, the focus detection unit 205 calculates reliability, which indicates the reliability of the image shift amount calculated in step S704. The reliability of the image shift amount can be defined by the degree of match (hereinafter referred to as the two-image match degree) fnclvl between the pair of image signals, the A image signal and the B image signal, and the steepness of the correlation change amount described above. The two-image match degree is an index indicating the accuracy of the image shift amount, and here, the smaller the value, the higher the accuracy. FIG. 10B is an enlarged view of the portion indicated by 1002 in FIGS. 10A, and 1004 is a part of the correlation amount 1001. The two-image match degree fnclvl can be calculated by the following formula (9).

$$(i)\ \text{if } |\Delta COR[k-1]| \times 2 \le maxder \tag{9}$$

$$fnclvl = COR[k-1] + \Delta COR[k-1]/4$$

$$(ii)\ \text{if } |\Delta COR[k-1]| \times 2 > maxder$$

$$fnclvl = COR[k] + \Delta COR[k]/4$$

Finally, in step S706, the focus detection unit 205 calculates the defocus amount of the focus detection area using the image shift amount of the focus detection area calculated in step S704.

As described above, according to the first embodiment, even in manual focus, particularly in moving image shooting, it is possible to suppress unintended focus shift due to gimbal tracking.

Second Embodiment

Next, a second embodiment of the present invention will be described. Note that the image capturing apparatus described in the first embodiment with reference to FIGS. 1, 2A, and 2B can also be used in the second embodiment, so a description thereof will be omitted here.

Next, the focus adjustment process in this embodiment will be described. Note that the focus adjustment process described below is performed by the camera control unit 204 in the camera unit 20 executing an image processing program stored in the ROM 204*a*.

Figure 12:
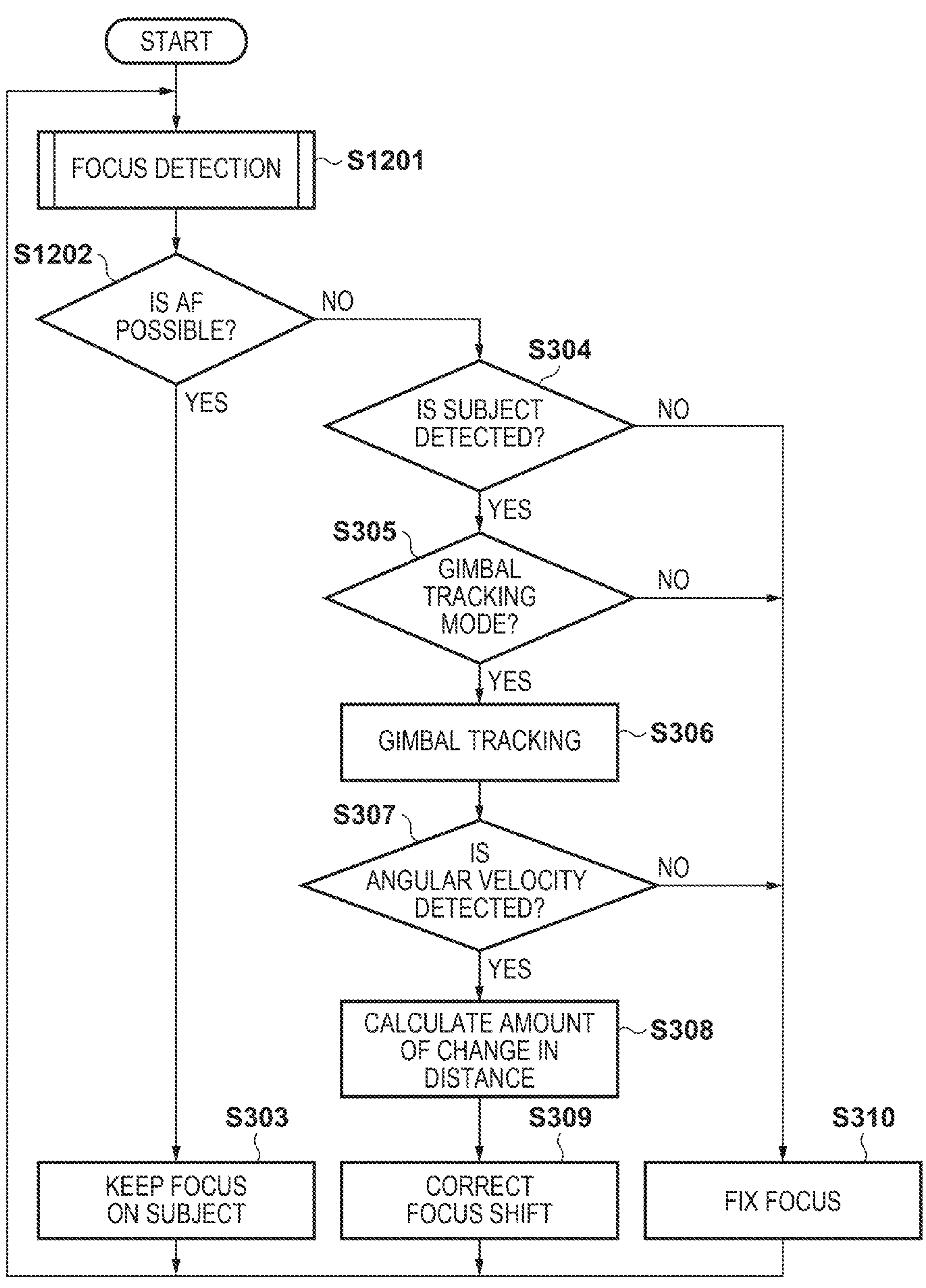
FIG. 12 is a flowchart of focus adjustment process according to a second embodiment.

FIG. 12 is a flowchart showing the procedure of the focus adjustment process. Note that, although the focus adjustment process during moving image shooting will be described in this embodiment, it may be performed during LV operation during still image shooting.

First, in step S1201, the camera control unit 204 causes the focus detection unit 205 to perform the focus detection process. The focus detection process is a process for acquiring information on the defocus amount and reliability for performing on-imaging plane phase difference AF. The area in the image screen for acquiring information is set according to the state of the camera unit 20. Note that details of the focus detection process are the same as those described with reference to FIGS. 7 to 11B in the first embodiment, and therefore will not be described here.

Next, in step S1202, the camera control unit 204 determines whether or not AF control is possible based on the focus detection result calculated in the focus detection process in step S1201. Whether or not AF control is possible can be determined, for example, based on whether the reliability calculated based on the above-mentioned two-image match degree or the steepness of the image shift amount satisfies a predetermined threshold condition. In addition, if it can be determined that the shooting conditions make it difficult to perform AF appropriately, such as when the brightness during moving image shooting is not within a predetermined brightness range or when the subject is dark and a large gain is applied, the focus detection result does not necessarily need to be used.

If AF control is possible, the process proceeds to step S303, where the focus lens 104 is controlled based on the defocus amount calculated in the focus detection process in step S1201, AF control is performed to keep the focus on the subject, and the process returns to step S1201. On the other hand, if AF control is not possible, the process proceeds to step S304.

The processes shown in steps S304 to S310 are similar to those described with reference to FIG. 3 in the first embodiment, and therefore will not be described. However, after the processes in steps S309 and S310, the process returns to step S1201 and the focus detection process is performed again.

As described above, according to the second embodiment, it is possible to suppress unintended focus shift due to gimbal tracking even in a state that is not suitable for performing AF, particularly in moving image shooting.

In the above-described first and second embodiments, the on-imaging plane phase difference AF method has been described as an example of a focus detection method, but the present invention is not limited to this. For example, focus detection may be performed by a so-called contrast AF method in which a predetermined frequency component is extracted by passing the signal data obtained by the image processing circuit 203 through a band pass filter, and focus detection processing is performed using the obtained contrast evaluation value. In this case, in step S1202, if the contrast is lower than a predetermined threshold value, it may be determined that AF is not performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-215047, filed Dec. 20, 2023 which is hereby incorporated by reference herein in its entirety.

What is claimed is:

1. A focus adjustment apparatus comprising one or more processors and/or circuitry configured to:

detect a rotation angle of a holding unit that holds an imaging unit including an image sensor and an optical system including a focus lens and that has a rotation unit that rotates the imaging unit;

control a position of the focus lens to perform focus adjustment; and in a case where the rotation angle of the holding unit is detected, calculate a correction amount for correcting a shift of an in-focus position according to a change amount of a distance between the imaging unit and a subject on which the focus adjustment is performed corresponding to the rotation angle, wherein the one or more processors and/or circuitry are configured such that:

the focus adjustment is capable of being performed in an autofocus (AF) mode that focuses on the subject based on a signal obtained from the image sensor, the correction amount is calculated in a case where the focus adjustment is not performed in the AF mode and the subject is tracked using the rotation unit, and the position of the focus lens is controlled based on the correction amount.

2. The focus adjustment apparatus according to claim 1, wherein the one or more processors and/or circuitry are further configured to detect an angle of rotation motion by the rotation unit, wherein the change amount is calculated based on the rotation angle of the holding unit, the angle of the rotation motion, a length from a center of rotation of the holding unit to the imaging unit, and a distance from the imaging unit to the subject before the holding unit rotates.

3. The focus adjustment apparatus according to claim 2, wherein the rotation angle of the holding unit is a declination angle around an axis that is a line connecting the center of rotation of the holding unit and the subject.

4. The focus adjustment apparatus according to claim 2, wherein the change amount is calculated using the law of cosines.

5. The focus adjustment apparatus according to claim 2, wherein the one or more processors and/or circuitry are further configured to:

detect an angular velocity of the rotation unit; and detect the angle of the rotation motion by integrating the angular velocity over time.

6. The focus adjustment apparatus according to claim 1, wherein the holding unit is a gimbal.

7. The focus adjustment apparatus according to claim 1, wherein the one or more processors and/or circuitry are further configured such that:

the position of the focus lens is controllable in a manual focus (MF) mode in response to an operation from an operating unit for specifying the position of the focus lens, switching is performed between the AF mode and the MF mode, and in a case where the MF mode is selected, the focus adjustment is not performed in the AF mode.

8. The focus adjustment apparatus according to claim 1, wherein the one or more processors and/or circuitry are further configured such that, in a case where reliability of a defocus amount obtained based on signals obtained from the image sensor is lower than a predetermined reliability, the focus adjustment is not performed in the AF mode.

9. The focus adjustment apparatus according to claim 1, wherein the one or more processors and/or circuitry are further configured to determine whether or not to perform control in the AF mode based on shooting conditions.

10. The focus adjustment apparatus according to claim 1, wherein the one or more processors and/or circuitry are further configured such that, in a case where brightness of the subject is not within a predetermined brightness range, the focus adjustment is not performed in the AF mode.

11. The focus adjustment apparatus according to claim 1, wherein the one or more processors and/or circuitry are further configured such that the focus adjustment is performed based on contrast of signals obtained from the image sensor, and the focus adjustment is not performed in the AF mode in a case where the contrast is lower than a preset threshold value.

12. The focus adjustment apparatus according to claim 1, wherein the the one or more processors and/or circuitry are further configured to:

detect an angular velocity of the holding unit; and detect the rotation angle by integrating the angular velocity over time.

13. The focus adjustment apparatus according to claim 1, wherein the position of the focus lens is controlled based on the correction amount in synchronization with tracking of the subject by the rotation unit.

14. An image capturing apparatus comprising one or more processors and/or circuitry configured to:

detect a rotation angle of a holding unit that holds an imaging unit including an image sensor and an optical system including a focus lens and that has a rotation unit that rotates the imaging unit;

control a position of the focus lens to perform focus adjustment; and in a case where the rotation angle of the holding unit is detected, calculate a correction amount for correcting a shift of an in-focus position according to a change amount of a distance between the imaging unit and a subject on which the focus adjustment is performed corresponding to the rotation angle; and the imaging unit; and the holding unit, wherein the one or more processors and/or circuitry are configured such that:

the focus adjustment is capable of being performed in an autofocus (AF) mode that focuses on the subject based on a signal obtained from the image sensor, the correction amount is calculated in a case where the focus adjustment is not performed in the AF mode and the subject is tracked using the rotation unit, and the position of the focus lens is controlled based on the correction amount.

15. An image capturing system comprising:

one or more processors and/or circuitry which configured to:

detect a rotation angle of a holding unit that holds an imaging unit including an image sensor and an optical system including a focus lens and that has a rotation unit that rotates the imaging unit;

control a position of the focus lens to perform focus adjustment; and in a case where the rotation angle of the holding unit is detected, calculate a correction amount for correcting a shift of an in-focus position according to a change amount of a distance between the imaging unit and a subject on which the focus adjustment is performed corresponding to the rotation angle;

the imaging unit; and the holding unit, wherein the one or more processors and/or circuitry are configured such that:

the focus adjustment is capable of being performed in an autofocus (AF) mode that focuses on the subject based on a signal obtained from the image sensor, the correction amount is calculated in a case where the focus adjustment is not performed in the AF mode and the subject is tracked using the rotation unit, and the position of the focus lens is controlled based on the correction amount, and the imaging unit is detachable from the holding unit.

16. The image capturing system according to claim 15, wherein the optical system is detachable from the image sensor.

17. A focus adjustment method comprising:

detecting a rotation angle of a holding unit that holds an imaging unit including an image sensor and an optical system including a focus lens and that has a rotation unit that rotates the imaging unit;

controlling a position of the focus lens to perform focus adjustment;

determining whether or not focus adjustment is performed in an autofocus (AF) mode that focuses on a subject based on a signal obtained from the image sensor;

calculating a correction amount for correcting a shift of an in-focus position according to a change amount of a distance between the imaging unit and the subject on which the focus adjustment is performed corresponding to the detected rotation angle in a case where the focus adjustment is not performed in the AF mode and the subject is tracked using the rotation unit, and correcting the position of the focus lens based on the correction amount.

18. A non-transitory computer-readable storage medium storing a program that is executable by the computer, wherein the program includes program code for causing the computer to function as a focus adjustment apparatus comprising one or more processors and/or circuitry configured to:

detect a rotation angle of a holding unit that holds an imaging unit including an image sensor and an optical system including a focus lens and that has a rotation unit that rotates the imaging unit;

control a position of the focus lens to perform focus adjustment; and in a case where the rotation angle of the holding unit is detected, calculate a correction amount for correcting a shift of an in-focus position according to a change amount of a distance between the imaging unit and a subject on which the focus adjustment is performed corresponding to the rotation angle, wherein the one or more processors and/or circuitry are configured such that:

the focus adjustment is capable of being performed in an autofocus (AF) mode that focuses on the subject based on a signal obtained from the image sensor, the correction amount is calculated in a case where the focus adjustment is not performed in the AF mode and the subject is tracked using the rotation unit, and the position of the focus lens is controlled based on the correction amount.

* * * * *